United States Patent
Giamei et al.

(10) Patent No.: US 10,303,575 B2
(45) Date of Patent: May 28, 2019

(54) TIME-SLICE-INSTRUMENTATION FACILITY

(71) Applicant: INTERNATIONAL BUSINESS MACHINES CORPORATION, Armonk, NY (US)

(72) Inventors: Bruce C. Giamei, Poughkeepsie, NY (US); Christian Jacobi, Poughkeepsie, NY (US); Daniel V. Rosa, Poughkeepsie, NY (US); Anthony Saporito, Poughkeepsie, NY (US); Donald W. Schmidt, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 15/402,412

(22) Filed: Jan. 10, 2017

(65) Prior Publication Data

US 2018/0196727 A1 Jul. 12, 2018

(51) Int. Cl.
*G06F 9/48* (2006.01)
*G06F 9/50* (2006.01)
(Continued)

(52) U.S. Cl.
CPC ........ *G06F 11/3433* (2013.01); *G06F 9/4881* (2013.01); *G06F 9/5033* (2013.01);
(Continued)

(58) Field of Classification Search
CPC .. G06F 11/3433; G06F 9/5033; G06F 9/4881; G06F 11/3419; G06F 11/3024;
(Continued)

(56) References Cited

U.S. PATENT DOCUMENTS

| 7,221,686 B1 | 5/2007 | Belcea |
| 9,311,149 B2 | 4/2016 | Bird et al. |

(Continued)

FOREIGN PATENT DOCUMENTS

| TW | 2012-14288 A | 4/2012 |
| TW | 2013-47473 A | 11/2013 |

(Continued)

OTHER PUBLICATIONS

IBM, "z/Architecture Principles of Operation," IBM® Publication No. SA22-7832-10, Eleventh Edition, Mar. 2015, pp. 1-1732.
(Continued)

*Primary Examiner* — Sisley N Kim
(74) *Attorney, Agent, or Firm* — Steven Chiu, Esq.; Kevin P. Radigan, Esq.; Heslin Rothenberg Farley & Mesiti P.C.

(57) ABSTRACT

A facility is provided for collecting time-slice-instrumentation information during processing unit execution. The facility counts, at least in part, occurrence of a specified processing unit event during a time-slice of processing unit execution. The counted events occurring during a first interval of execution and a second interval of execution of the time-slice are retained. The first interval of execution is earlier in the time-slice than the second interval of execution, and the counted events facilitate adjusting performance of the processing unit. In an embodiment, the time-slice is a contiguous period of time of processing unit execution, and the specified processing unit event includes a cache event. The processing unit may interleave processing of multiple different units of work across multiple contiguous time-slices, and during a single time-slice, a single unit of work of the multiple different units of work is processed by the processing unit.

19 Claims, 10 Drawing Sheets

(51) Int. Cl.
*G06F 11/30* (2006.01)
*G06F 11/34* (2006.01)

(52) U.S. Cl.
CPC ...... *G06F 11/3024* (2013.01); *G06F 11/3419* (2013.01); *G06F 2201/88* (2013.01); *G06F 2201/885* (2013.01); *G06F 2209/508* (2013.01)

(58) Field of Classification Search
CPC ......... G06F 2209/508; G06F 2201/885; G06F 2201/88
See application file for complete search history.

(56) References Cited

U.S. PATENT DOCUMENTS

| | | | |
|---|---|---|---|
| 2008/0256542 A1* | 10/2008 | Kurata | G06F 9/462 718/102 |
| 2011/0246995 A1 | 10/2011 | Fedorova et al. | |
| 2016/0239421 A1* | 8/2016 | Abraham | G06F 12/0842 |

FOREIGN PATENT DOCUMENTS

| | | |
|---|---|---|
| TW | 2014-32562 A | 8/2014 |
| WO | WO2012155462 A1 | 11/2012 |

OTHER PUBLICATIONS

IBM, "Power ISA™ Version 2.07B," International Business Machines Corporation, Apr. 9, 2015, pp. 1-1527.

\* cited by examiner

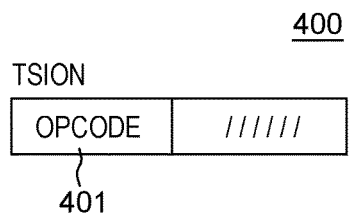
FIG. 4A
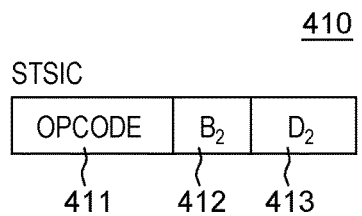
FIG. 4B
| RESERVED | RESERVED | TSIVN |
|---|---|---|
| TSI C1 FIRST INTERVAL LOG | TSI C1 LAST INTERVAL LOG | |
| TSI C2 FIRST INTERVAL LOG | TSI C2 LAST INTERVAL LOG | |
| TSI C3 FIRST INTERVAL LOG | TSI C3 LAST INTERVAL LOG | |
| TSI C4 FIRST INTERVAL LOG | TSI C4 LAST INTERVAL LOG | |
| TSI C5 FIRST INTERVAL LOG | TSI C5 LAST INTERVAL LOG | |
| TSI C6 FIRST INTERVAL LOG | TSI C6 LAST INTERVAL LOG | |
| TSI C7 FIRST INTERVAL LOG | TSI C7 LAST INTERVAL LOG | |
FIG. 4C 500
| DISPATCH QUEUE | | |
|---|---|---|
| WORK ID | CPU ID | COMMENT |
| 1 | A | |
| 2 | A | CONSUMES LARGE DCACHE FOOTPRINT |
| 3 | A | |
| 4 | A | |
FIG. 5A
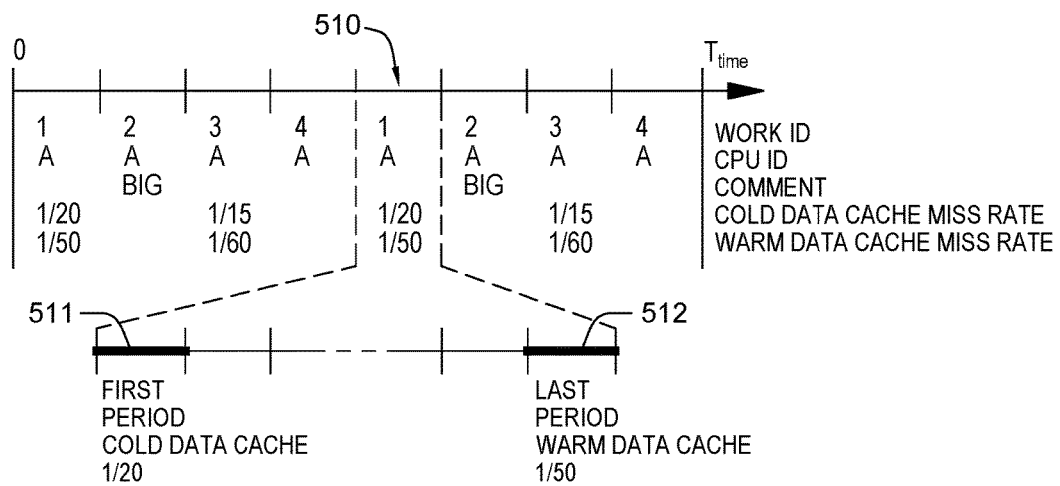
FIG. 5B
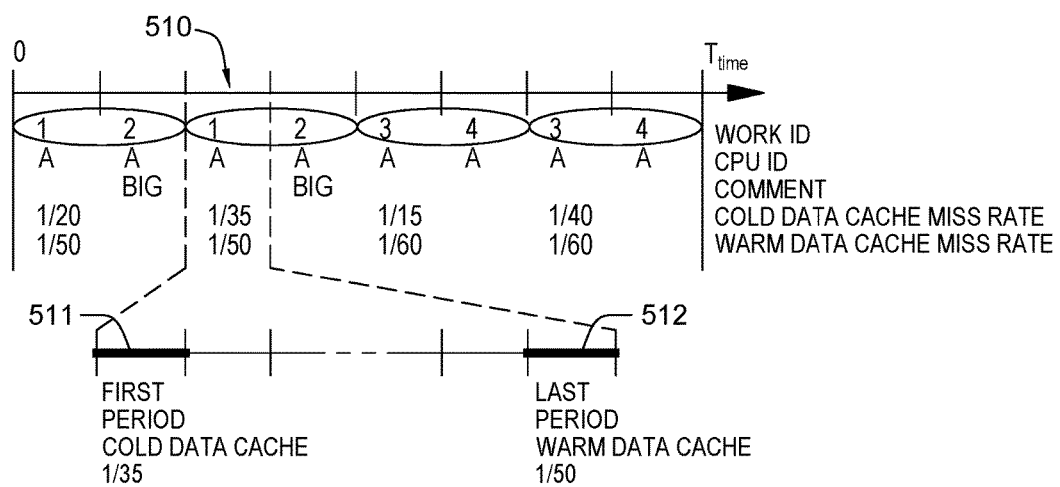
FIG. 5C

TIME-SLICE-INSTRUMENTATION FACILITY

BACKGROUND

One or more aspects relate, in general, to processing within a computing environment, and in particular, to improving such processing.

In a computer system, a scheduler may manage allocating units of work to computer resources by assigning priority among the various units of work to be performed. The scheduler determines when to dispatch a unit of work, and to which computer resource, and the duration of time allocated to occupy the resource. The workload scheduler may include tracking agents running on machines under the schedulers' control. A controller's databases hold details of the work to run, the scheduling instructions and information about resources and restrictions. The databases may provide information to determine when work will run in the future. Additionally, a detailed production schedule is derived from the information to allow submitting jobs when processes are complete and resources are available.

Job scheduling software can improve the workload performance by grouping a set of jobs or units of work with a cumulative cache footprint similar to, but not exceeding, the allocated processing unit's overall cache structure. Typically, the workload is periodically scheduled for processing in fragments of time. Each fragment of time is considered a time-slice.

SUMMARY

Shortcomings of the prior art are overcome and additional advantages are provided through the provision of a computer program product for facilitating processing in a computing environment. The computer program product includes a storage medium readable by a processing circuit and storing instructions for execution by the processing circuit for performing a method. The method includes, for instance, collecting time-slice-instrumentation information for a processing unit during execution. The collecting includes: counting, at least in part, occurrence of a specified processing unit event during a time-slice of the processing unit execution; and retaining counted processing unit events occurring during a first interval of execution within the time-slice and a second interval of execution within the time-slice. The first interval of execution is earlier in the time-slice than the second interval of execution, and the counted processing unit events facilitate adjusting performance of the processing unit.

Advantageously, computing environment processing is enhanced by providing processor or processing unit instrumentation, referred to herein as time-slice-instrumentation, which is a facility (for work scheduling software) to obtain measurements of events occurring within the processing unit, during two distinct periods of time while processing a unit of work, that is, within two distinct intervals of execution of a time-slice of the processing unit. The specified processing unit events measured (or counted) may include local cache metrics. The intervals of time for which measurements are recorded correspond to early and late intervals within a contiguous time, that is, a time-slice, of the processor's processing a unit of work. The counted processing unit events are retained, and may be analyzed, for instance, by a work load scheduler for consideration during subsequent work dispatch decisions. Advantageously, the facility provides (in one or more aspects) a mechanism to reduce processing unit cache misses, and therefore, improves performance for individual units of work, as well as for a workload in general.

In one or more implementations, the facility presented herein introduces new instrumentation counters, new counter logs, a new instruction to initiate the counter data collection, and a new instruction to read and store counter logs. Access to the counters and logs disclosed herein may be restricted to programs in the supervisor state.

More particularly, in one or more implementations, the time-slice may be a contiguous period of time of processing unit execution, and the specified processing unit event may be or include a cache event. The processing unit may interleave processing of multiple different units of work across multiple contiguous time-slices, and during a single time-slice, a single interval of work of the multiple different units of work is processed by the processing unit.

In one or more embodiments, the first interval of execution includes an initial interval of execution within the time-slice, and the second interval of execution includes a most recently completed interval of execution within the time-slice. The first interval of execution and the second interval of execution may be of equal duration. Further, in one or more embodiments, the second interval of execution may include a last interval of execution within the time-slice.

In one or more implementations, the counting may include using time-slice-instrumentation counters local to the processing unit and performing the counting of the occurrence of the specified processing unit event during the time-slice of the processing unit execution. In one embodiment, the specified processing unit event may include a cache event selected from a group consisting of: a cache miss and a cache hit.

By way of example, in one or more embodiments, the collecting may be initiated by executing a time-slice-instrumentation on instruction, and the retaining of the counted processing unit of events may be initiated by executing a store time-slice-instrumentation counters instruction.

In another aspect, a computer system for facilitating processing within a computing environment is provided. The computer system includes a memory, and a processor communicatively coupled with the memory, wherein the computer system is configured to perform a method. The method includes collecting time-slice-instrumentation information for a processing unit during execution. The collecting includes: counting, at least in part, occurrence of a specified processing unit event during a time-slice of the processing unit execution; and retaining counted processing unit events occurring during a first interval of execution within the time-slice and a second-interval of execution within the time-slice. The first interval of execution is earlier in the time-slice than the second interval of execution, and the counted processing unit events facilitate adjusting performance of the processing unit.

In a further aspect, a computer-implemented method of facilitating processing within a computing environment is provided. The computer-implemented method includes, for instance, collecting time-slice-instrumentation information for a processing unit during execution. The collecting includes: counting, at least in part, occurrence of a specified processing unit event during a time-slice of the processing unit execution; and retaining counted processing unit events occurring during a first interval of execution within the time-slice and a second interval of execution within the time-slice. The first interval of execution is earlier in the time-slice than the second interval of execution, and the counted processing unit events facilitate adjusting performance of the processing unit.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4A depicts one example of a Time-Slice-Instrumentation ON (TSION) instruction, in accordance with one or more aspects of the present invention;

FIG. 4B depicts one example of a Store Time-Slice-Instrumentation Counters (STSIC) instruction, in accordance with one or more aspects of the present invention;

FIG. 4C depicts one embodiment of a data structure storing measurements extracted by the Store Time-Slice-Instrumentation Counters (STSIC) instruction, in accordance with one or more aspects of the present invention;

FIG. 5A depicts one example of a workload to be executed by a processing unit and to undergo time-slice-instrumentation monitoring, in accordance with one or more aspects of the present invention;

FIG. 5B depicts example measurements of cache metrics during first and last intervals of execution within a respective time-slice for each work unit identified in the data structure of FIG. 5A, in accordance with one or more aspects of the present invention;

FIG. 5C depicts an example of a modified execution schedule after time-slice-instrumentation measurements have been evaluated, and showing improved cache metrics for one or more units of work of the workload of FIG. 5A, in accordance with one or more aspects of the present invention;

DETAILED DESCRIPTION

Figure 1A:
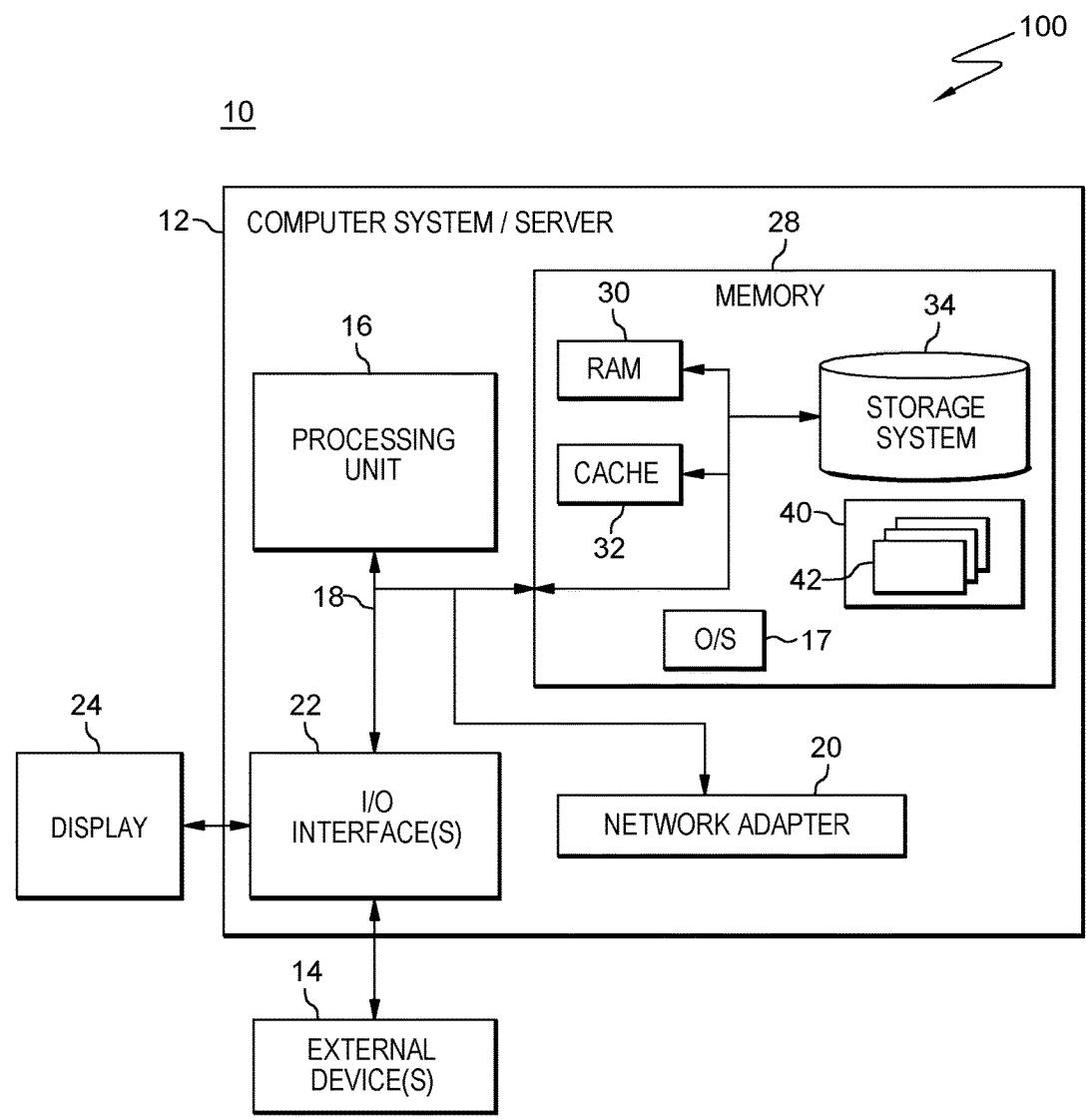
FIG. 1A depicts one example of a computing environment to incorporate and use one or more aspects of the present invention.

Improved computing environment performance is provided by computer processing unit instrumentation, referred to herein as Time-Slice-Instrumentation (TSI), which provides a facility for work scheduling (e.g., work scheduling software) to obtain measurements of events occurring within a processing unit (PU), such as a Central Processing Unit (CPU), during two distinct intervals of execution within a time-slice, while the processing unit is processing a respective unit of work. The processing unit events measured may include local cache metrics. The periods for which measurements are recorded correspond to, in one or more embodiments, early and late intervals within the time-slice (i.e., a contiguous unit of time) of PU processing. The measurements obtained may be analyzed by a workload scheduler provided as an operating system component, and considered during subsequent work dispatch decisions. A resulting benefit may be reduced processing unit cache misses, and therefore, improved performance, for individual units of work, as well as for the workload as a whole.

A time-slice-instrumentation facility disclosed herein provides an operating system with a capability to measure, for instance, cache structure events during separate intervals of execution within a time-slice of processor execution. Cache events monitored may be machine dependent, and may include common cache-related performance metrics such as cache misses, cache hits, MRU, etc. The two periods of execution time to collect the new instrumentation are, e.g., of equal duration and identified, in one embodiment, to the hardware by the software. In one or more implementations, the first interval of execution may cover the beginning of a work unit's dispatched time-slice, when the cache is "cold", and the second period of execution may cover the end of the work unit's dispatched time-slice, when the cache is "warm". The retained results of the counted processing unit events may be compared for the time-slice, and used to modify subsequent workload dispatch groupings as appropriate. The time-slice-instrumentation facility disclosed herein may be implemented as an independent facility in association with a processing unit. As described further below, new instrument counters, new counter logs, and new instructions may be employed to initiate new counter data collection, and read and store new counter logs. Access to the new counters and logs may be restricted to programs in the supervisor state.

More particularly, the time-slice-instrumentation facility disclosed herein, when installed, provides a capability to a control program, such as a workload scheduler, for measuring certain processing unit events during two intervals of program execution, for instance, within a common time-slice. The Time-Slice-Instrumentation (TSI) facility includes a repeating interval pulse local to each processing unit, a number of TSI counters local to each processing unit, pairs of TSI counter logs for all TSI counters local to each processing unit, and instructions to initiate and extract data measurements, including Time-Slice-Instrumentation ON (TSION), and Store Time-Slice-Instrumentation Counters (STSIC). When the Time-Slice-Instrumentation is active on a processing unit, the processing unit periodically restarts counting a number of processing unit events, such as cache misses or cache hits, as explained further below.

The processing unit maintains a history of the counted events which occurred during, for instance, initial and most-recently completed intervals of execution within a time-slice. The recorded and saved TSI counter values may be referred to as TSI counter logs. As noted, the time-slice-instrumentation may be activated by using the Time-Slice-Instrumentation ON instruction, and the measured data may be obtained by using the Store Time-Slice-Instrumentation Counters instruction, described herein.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1A, a computing environment 100 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system 17, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
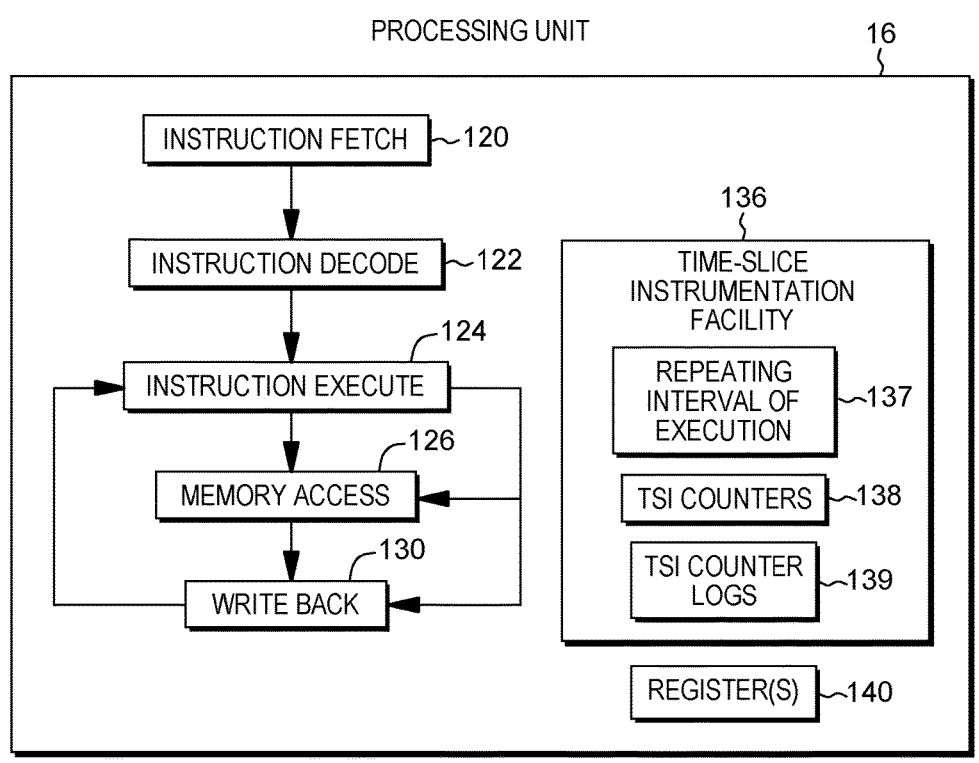
FIG. 1B depicts further details of the processing unit of FIG. 1A, in accordance with an aspect of the present invention.

As an example, processing unit 16 includes a plurality of functional components used to execute instructions. As depicted in FIG. 1B, these functional components include, for instance, an instruction fetch component 120 to fetch instructions to be executed; an instruction decode unit 122 to decode the fetched instructions; instruction execution components 124 to execute the decoded instructions; a memory access component 126 to access memory for instruction execution, if necessary; and a write back component 130 to provide the results of the executed instructions. One or more of these components may, in accordance with an aspect of the present invention, be used to implement a time-slice-instrumentation facility 136, which includes, in one or more embodiments, a repeating interval of execution 137, TSI counters 138 and TSI counter logs 139, as described further below.

Processing unit 16 also includes, in one embodiment, one or more registers 140 to be used by one or more of the functional components.

Figure 2A:
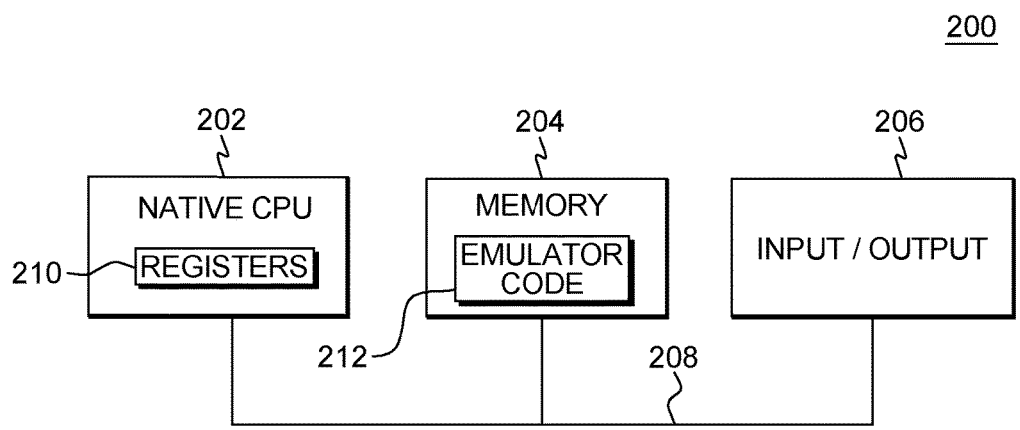
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
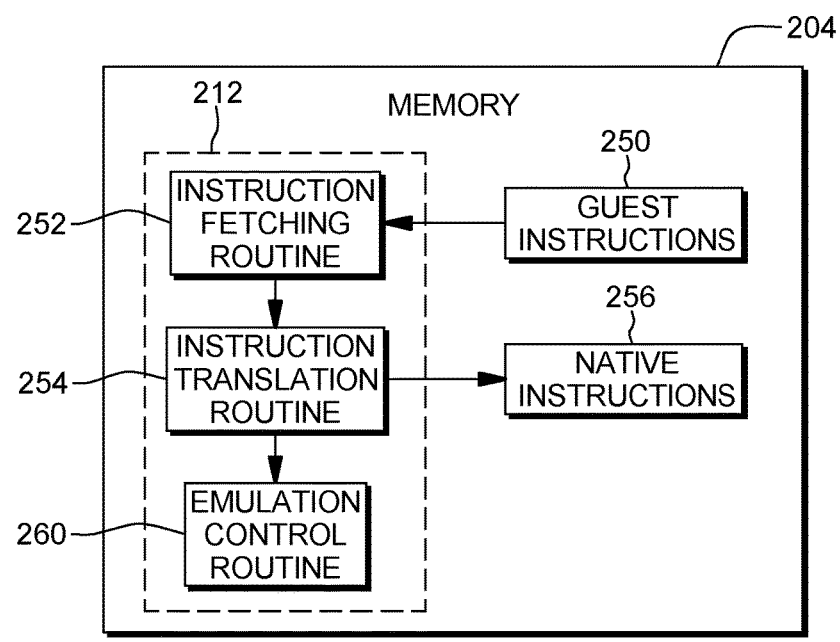
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. The term includes, for instance, the hardware-level instructions and/or data structures used in implementation of higher level machine code. In one embodiment, firmware may include, for instance, proprietary code that is typically delivered as microcode that includes trusted software or microcode specific to the underlying hardware and controls operating system access to the system hardware.

A guest instruction 250 that is obtained, translated and executed is, for instance, a Time-Slice-Instrumentation ON (TSION) or a Store Time-Slice-Instrumentation Counters (STSIC) instruction, described herein. The instruction, which is of one architecture (e.g., the z/Architecture), is fetched from memory, translated and represented as a sequence of native instructions 256 of another architecture (e.g., PowerPC, pSeries, Intel, etc.). These native instructions may then be executed.

Details relating to one or more embodiments of a Time-Slice-Instrumentation ON (TSION) instruction and a Store Time-Slice-Instrumentation Counters (STSIC) instruction, including fields of the instructions and execution by a processor (either in a native or emulated system) are described herein.

In accordance with one or more aspects of the present invention, a time-slice-instrumentation facility is presented for collecting time-slice-instrumentation information for a processing unit during execution, such as for a central processing unit during execution of a unit of work. The collecting, which may be initiated by the Time-Slice-Instrumentation ON (TSION) instruction disclosed herein, may include counting, at least in part, occurrence of a specified processing unit event during a time-slice of the processing unit execution, and retaining counted processing unit events occurring during a first interval of execution within the time-slice and a second interval of execution within the time-slice. The first interval of execution is earlier in the time-slice than the second interval of execution, and the retained, counted processing unit events facilitate adjusting performance of the processing unit. The retaining may be initiated by executing the Store Time-Slice-Instrumentation Counter (STSIC) instruction disclosed herein.

In one or more implementations, the time-slice may be a contiguous period of time of processing unit execution, and the specified processing unit event may be or include a cache event. By way of example, the processing unit may be scheduled to interleave processing of multiple different units of works across multiple contiguous time-slices, and during a single time-slice, a single unit of work of the multiple different units of work may be processed by the processing unit. In one or more implementations, the first interval of execution includes an initial interval of execution within the respective time-slice, and the second interval of execution includes a most-recent interval of execution within the time-slice. In implementation, the first interval of execution and the second interval of execution may be of equal duration. By way of example, the second interval of execution may be a last interval of execution within the time-slice.

In one or more embodiments, the counting may include using time-slice-instrumentation counters local to the processing unit in performing the counting of the occurrence of the specified processing unit event during the time-slice of the processing unit execution. By way of specific example, the specified processing unit event may include a data cache event, such as a cache miss or a cache hit. As noted, the collecting may be initiated by executing a time-slice-instrumentation on instruction, and at least one of the counting and retaining may be initiated by executing a store time-slice-instrumentation counters instruction.

The time-slice-instrumentation facility, when installed, provides a capability to a control program, such as an operating system, for measuring certain processing unit events (such as CPU events), occurring during two intervals of program execution within a time-slice. The Time-Slice-Instrumentation (TSI) facility includes a repeating interval pulse local to each processing unit, a number of TSI counters local to each processing unit, and pairs of TSI counter logs for TSI counters local to each processing unit. When the Time-Slice-Instrumentation is active on a processing unit, the processing unit periodically restarts counting a number of events. The processing unit may maintain a history of the counted events which occurred during the initial and most-recently completed intervals of execution within a time-slice. The recorded and saved time-slice counter values are referred to herein as TSI counter logs. As noted, time-slice-instrumentation may be activated by using the Time-Slice-Instrumentation ON instruction, and measured data may be obtained by using the Store Time-Slice-Instrumentation Counters instruction.

In one or more implementations, measurement data provided by the time-slice-instrumentation facility may be used for statistical comparison of performance related characteristics obtained during two separated intervals of execution within a time-slice of PU execution of a unit of work.

Figure 3:
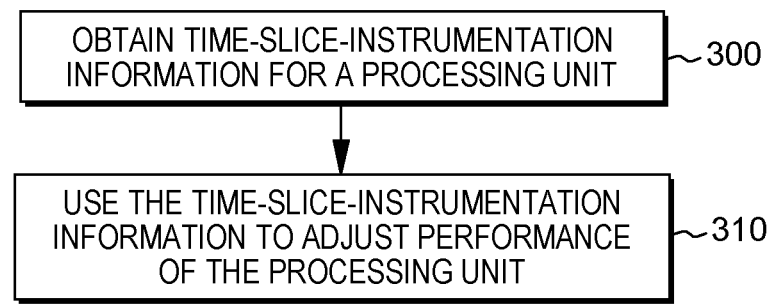
FIG. 3 depicts one embodiment of processing performed utilizing a time-slice-instrumentation facility, in accordance with one or more aspects of present invention.

FIG. 3 depicts one embodiment of processing, in accordance with one or more aspects of the present invention. As illustrated, the processing may include obtaining time-slice-instrumentation information (such as described herein) for a processing unit during execution 300. The time-slice-instrumentation information may then be used, for instance, by an operating system or workload scheduler, to adjust performance of the processing unit by, for instance, rescheduling assignment of units of work to the processing unit 310.

FIG. 4A depicts one example of a Time-Slice-Instrumentation ON instruction 400. As shown, the instruction includes an opcode field 401 indicating a time-slice-instrumentation on operation.

Execution of the Time-Slice-Instrument ON instruction in supervisor state initiates time-slice-instrumentation data collection in the processing unit, which may include, for instance:
  resetting TSI counters to contain zeros
  resetting TSI counter logs to contain FFFFFFFF hex
  starting time-slice-instrumentation periodic intervals
  starting to count each occurrence of a specified processing unit event in the corresponding TSI counter
In one or more embodiments, the condition code remains unchanged.

After the first interval completes, each TSI counter value is recorded and preserved locally in the corresponding TSI counter first interval log, an embodiment of which is illustrated in FIG. 4C, where the TSI counter first interval logs 420 are on the left side of the data structure. Afterwards, TSI counters may be reset to contain zeros and TSI counters resume counting the corresponding processing unit events. After any subsequent interval completes, each TSI counter value may be recorded and preserved locally in the corresponding TSI counter last interval logs 421, shown in FIG. 4C. After which, the TSI counters are again reset to contain zeros, and the TSI counters resume counting the corresponding CPU events.

The TCI interval duration may be a machine dependent number of processing units cycles, which may be determined by the Time-Slice-Instrumentation Version Number (TSIVN) 422 recorded, e.g., in the data structure of FIG. 4C. As understood by one skilled in the art, different computing machines may operate on different numbers of cycles, and/or different processing unit events may be measured dependent on the TSI Version Number.

The number of TSI counters monitoring processing unit events may vary, for instance, from 1 to 7, in one or more implementations. The number of TSI counters may be machine dependent. The processing unit event monitored by each TSI counter may also be machine dependent. Again, the model dependent characteristics of time-slice-instrumentation may be determined by the Time-Slice-Instrumentation Version Number 422 (FIG. 4C).

In one or more embodiments, the TSI counters may be 32 bits (as one example only). Each TSI counter may record measured values in a 32 bit first interval log 420 (FIG. 4C) and a 32 bit last interval log 421, with a carry out of bit position 0 in any TSI counter being discarded. In one or more embodiments, the TSI counters may count processing unit events in supervisor state and problem state. During processing unit retry and processing unit reset, in one embodiment, TSI counters may be reset to 0, TSI counter logs may be reset to, for instance, FFFFFFFF hex, and no time-slice counter will increment until a subsequent Time-Slice-Instrumentation ON instruction successfully completes. Miscellaneous conditions recognized by the processing unit may temporarily disallow or interrupt TSI measurements, and these conditions may result in resetting the TSI counter log to FFFFFFFF hex.

One embodiment of a Store Time-Slice-Instrumentation Counters (STSIC) instruction 410 is depicted in FIG. 4B. As shown, the instruction may have a plurality of fields, and a field may have a subscript number associated therewith. The subscript number associated with a field of the instruction denotes the operand to which the field applies. For instance, the subscript number 2 associated with $B_2$ denotes that the contents of the register specified in $B_2$ are associated with a second operand.

By way of example, instruction 410 includes an opcode field 411, which may indicate a store time-slice-instrumentation operation, a base field ($B_2$) 412 and a displacement field ($D_2$) 413. $B_2$ 412 may indicate a register, the contents of which are to be added to the value specified in $D_2$ 413 to give a second operand location identifying the address where the time-slice-instrumentation information is to be stored. In one or more implementations, the fields may be separate and independent of one another; however, in other embodiments, more than one field may be combined. Further, although various fields and registers are described, one or more aspects of the present invention may use other, additional or less fields or registers, or other size of fields or registers, etc. Many variations are possible. For instance, implied registers may be used instead of explicitly specified registers or fields of the instruction.

In operation, the TSI information is placed at the second operand location. In one implementation, the second operand may be eight double words in length. By way of example, the condition code may remain unchanged. Further information regarding the instruction is described below.

Executing the Store Time-Slice-Instrumentation Counters (STSIC) instruction, e.g., in supervisor state, stores the TSI information as a block in storage (referred to as the STSIC storage block or data structure (as illustrated in FIG. 4C) at the second operand location of the STSIC instruction. The TSI information and the STSIC storage block may include a TSI version number 422, as well as the desired number of TSI counter first and interval logs 420, 421, with 7 counter (C1 ... C7) first and last interval logs being depicted, by way of example only.

When the number of TSI counters supported on a particular machine is less than 7, as indicated by TSIVN 422, the TSI counter first and last interval logs of the STSIC storage block or data structure associated with the unsupported TSI counters may be stored using value FFFFFFFF hex, as an example. Access exceptions may be recognized for the 64 bytes of the STSIC storage block.

Based on the STSIC instruction being executed before the first TSI interval completes, then the TSI counter first and last interval logs may contain the value FFFFFFFF hex, as an example.

Based on the STSIC instruction being executed before the second TSI interval completes, then the TSI counter last interval logs may contain the value FFFFFFFF hex, as an example.

As noted, the model dependent characteristics of time-slice-instrumentation may be determined by the Time-Slice-Instrumentation Version Number (TSIVN) 422, which as noted, may indicate a TSI interval (number of CPU cycles), as well as the CPU events to be monitored.

In one or more implementations, the processing unit events counted during the different intervals of execution within the time-slice of the processing unit may include cache events, such as data cache events. For instance, data cache misses or data cache hits may be counted. In one or more implementations, the processing unit events counted may include L1 data cache misses, L2 data cache misses, L2 data cache hits in the first quartile, L2 data cache hits in the second quartile, L2 data cache hits in the third quartile, L2 data cache hits in the fourth quartile, L3 shared cache hits for data, or L3 shared cache misses for data.

Note that in one or more implementations, a control program may be aware of various interrupts that may occur between initiating TSI data collection and extracting TSI measurements that could potentially lead to errant interpretation results. The program executing an STSIC instruction could recognize an incomplete or interrupted TSI measurement, and therefore, an unusable result, by testing a supported TSI counter last interval log for a value of, e.g., FFFFFFFF hex.

Note also that the TSI interval duration may be measured in a number of processing unit cycles, rather than in an amount of time, to appear more consistent across several models running with different frequencies in various levels of performance scaling. In one or more embodiments, the TSI interval duration may be defined per machine such that no TSI counter requires more than 32 bits to represent any measured value. Potential TSI counter overflows may not be indicated in order to simplify machine implementation.

FIGS. 5A-5C illustrate one example of how a time-slice-instrumentation facility may be employed, in accordance with one or more aspects of the present invention. By way of example, FIG. 5A depicts a dispatch queue which includes four units of work having work ID 1, 2, 3, 4 scheduled for processing in processing unit ID A. In this example, work ID 2 is noted to consume a large data cache (Dcache) footprint.

FIG. 5B depicts one example of an original dispatch schedule where the dispatch queue interleaves work ID 1, 2, 3, 4 in consecutive time-slices 510 on processing unit A. By way of example, "cold" data cache miss rates and "warm" data cache miss rates are counted by the time-slice-instrumentation facility. The time-slice-instrumentation information counted (or measured) may include any processing unit cache metrics during first and last periods within a time-slice or dispatch time for each unit of work such as units of work (work ID 1, 2, 3, 4). In the example depicted in FIG. 5B, in the first interval of execution 511 of the expanded time-slice 510, the "cold" data cache miss rate is 1 out of 20, while the last interval of execution 512 for time-slice 510 is 1 out of every 50, meaning that the cache utilization is more efficient in the last interval of execution than the first interval of execution. In particular, at the start of the time-slice, when the data cache is "cold" for the current unit of work (e.g., work ID 1) on the processing unit A, one in every 20 instructions results in a data cache miss, while later in the time-slice, such as the last interval of execution 512, the data cache miss rate is 1 out of every 50 instructions.

By counting and tracking the specified processing unit event (e.g., data cache miss rate) for each unit of work in their respective time-slices, and in particular, within the first and last intervals of execution 511, 512, the resultant time-slice-instrumentation information may be used to, for instance, modify the dispatch schedule as depicted in FIG. 5C. In this example, the units of work ID 1 and ID 2 are grouped into a set, and the units of work ID 3 and ID 4 are grouped into a set by, for instance, the workload manager or scheduler. As shown in FIG. 5C, by counting the data cache miss rates in the first and last intervals of execution 511, 512 of time-slice 510, the measured cache metrics have improved for workload ID 1 running on processing unit A, since the "cold" data miss rate is now 1 out of every 35 instructions, and the "warm" data cache rates remain 1 out of every 50. In this example, note that the time between time=0 and time=T, represents a cumulative amount of time each work unit runs and is the same when comparing between the original dispatch schedule of FIG. 5B and the modified of FIG. 5C.

Figure 6A:
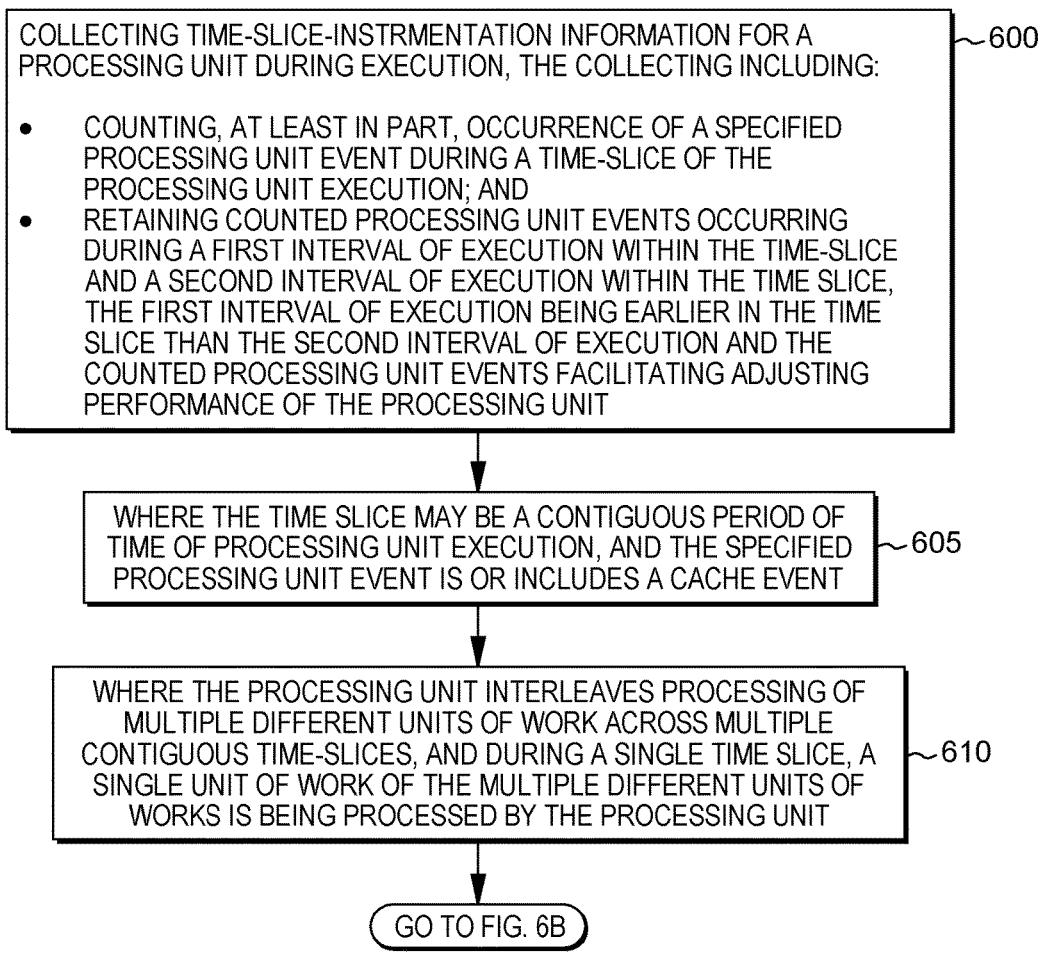
FIGS. 6A-6B depict one example of time-slice-instrumentation processing, in accordance with one or more aspects of the present invention.

Referring to FIG. 6A, the time-slice-instrumentation facility disclosed herein provides processing which includes collecting (600) time-slice-instrumentation information for a processing unit during execution. The collecting may include: counting, at least in part, occurrence of a specified processing unit event during a time-slice of the processing unit execution; and retaining counted processing unit events occurring during a first interval of execution within the time-slice and a second interval of execution within the time-slice. The first interval of execution is earlier in the time-slice than the second interval of execution, and the counted processing unit events facilitate adjusting performance of the processing unit.

The time-slice may be a contiguous period of time of processing unit execution and the specified processing unit event may be or include a cache event (605). The processing unit interleaves processing of multiple different units of work across multiple contiguous time-slices, and during a single time-slice, the single unit of work of the multiple different units of work is processed by the processing unit (610).

Figure 6B:
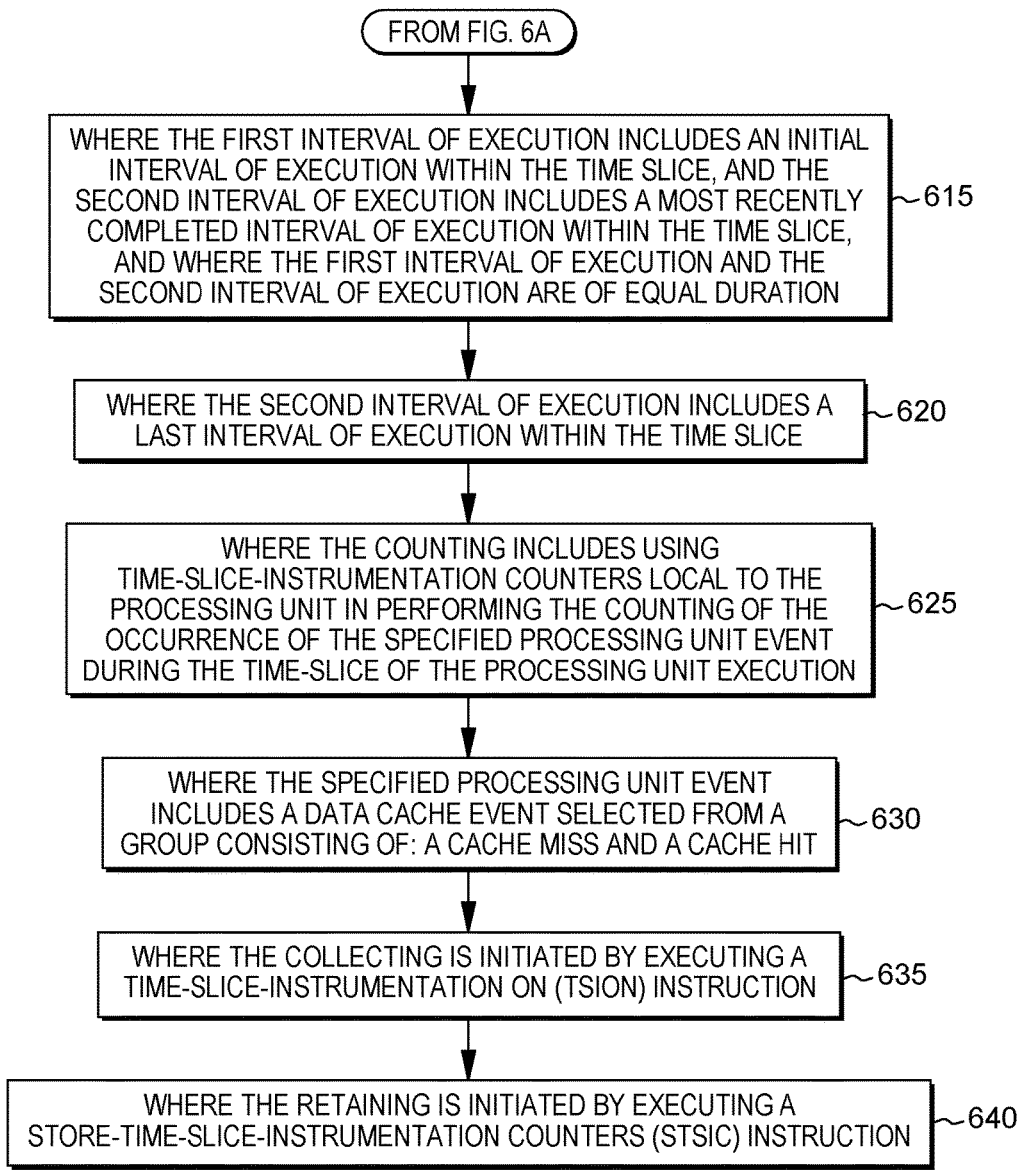

As an example, as show in FIG. 6B, the first interval of execution may include an initial interval of execution within a time-slice, and the second interval of execution may include a most-recently completed interval of execution within the time-slice (615). In one or more implementations, the first and second intervals of execution are of equal duration, and the second interval of execution may include a last interval of execution time within the time-slice (620). As illustrated, the counting may include using time-slice-instrument counters local to the processing unit in performing the counting of the occurrence of the specified processing unit event during the time-slice of the processing unit execution (625). The specified processing event may include a data cache event selected from a group consisting of: a cache miss and a cache hit (630). In one or more embodiments, the collecting may be initiated by executing a time-slice-instrumentation on instruction (635), and the retaining may be initiated by executing a store time-slice-instrumentation counters instruction (640).

Although various examples are provided, variations are possible without departing from a spirit of the claimed aspects. For example, values that are included in registers and/or fields used by the instruction may, in other embodiments, be in other locations, such as memory locations, etc. Many other variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 1A.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
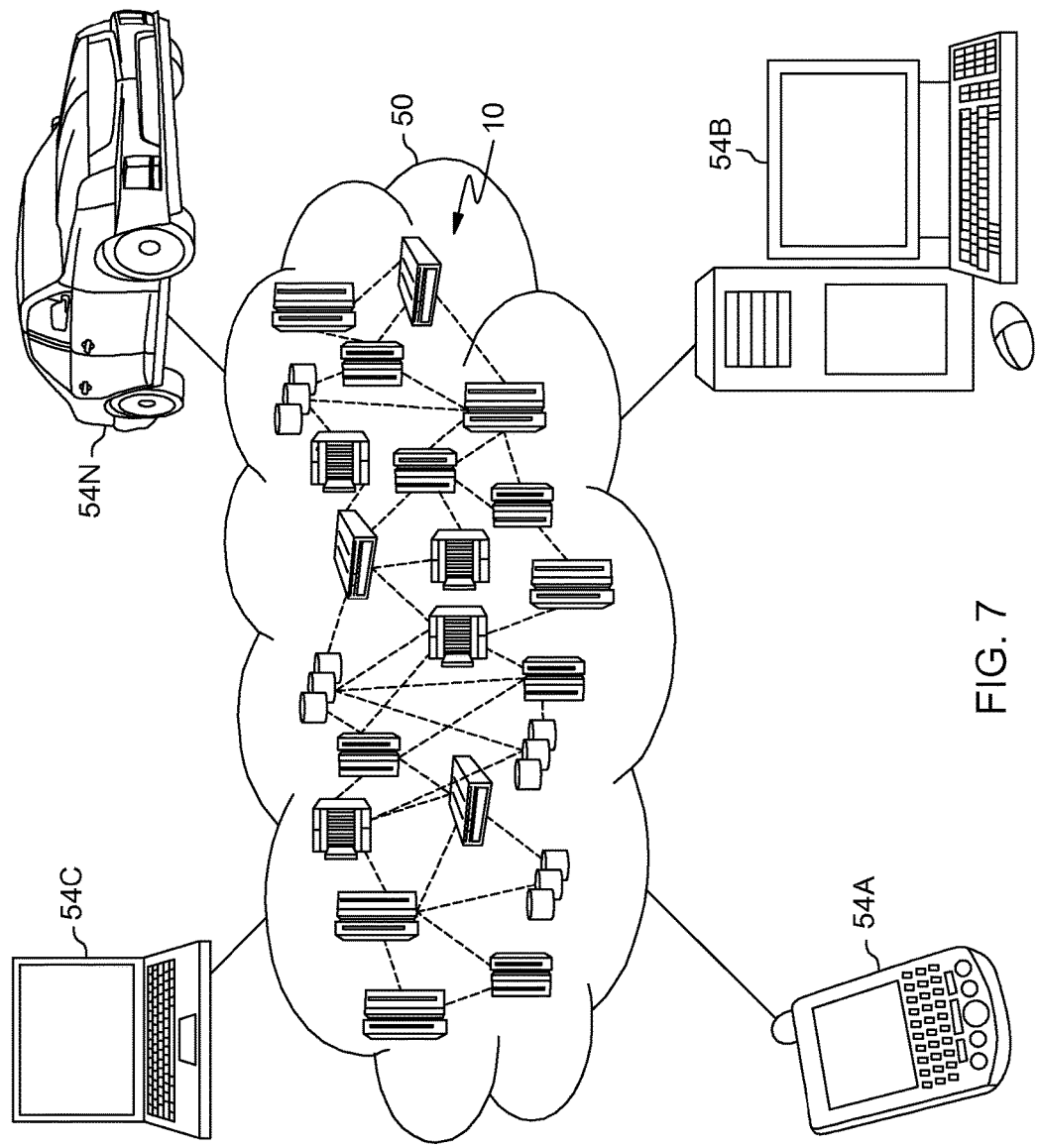
FIG. 7 depicts one embodiment of a cloud computing environment.

Referring now to FIG. 7, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
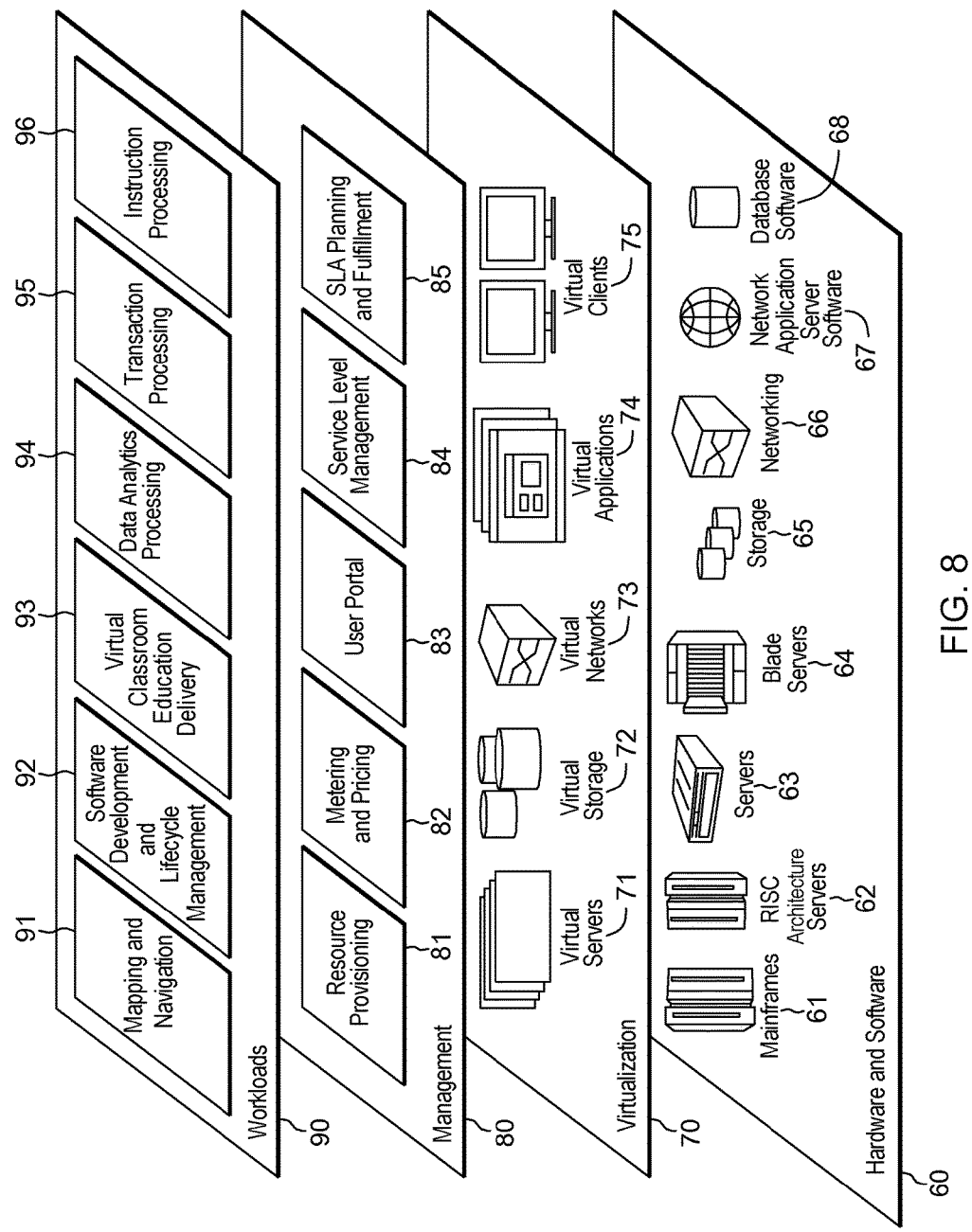
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a computer readable storage medium readable by a processing circuit and storing instructions for execution by the processing circuit for performing a method comprising:
        collecting time-slice-instrumentation information for a processing unit during execution, wherein the processing unit interleaves processing of multiple different units of work across multiple contiguous time-slices, and during a time-slice, a single unit of work of the multiple different units of work is processed by the processing unit, the collecting comprising:
            separating a time-slice of the processing unit execution into a plurality of intervals of execution, including a first interval of execution and a second interval of execution;
            counting, at least in part, occurrence of a specified processing unit event during the first interval of execution of the time-slice of the processing unit execution and counting occurrence of the specified processing unit event during the second interval of execution of the time-slice of the processing unit execution, the first interval of execution being earlier in the time-slice than the second interval of execution;
            retaining counted processing unit events occurring during the first interval of execution within the time-slice and the second interval of execution within the time-slice; and
            using the counted processing unit events occurring during the first interval of execution within the time-slice and the second interval of execution within the time-slice to adjust a processing schedule of the multiple different units of work by the processing unit.

2. The computer program product of claim 1, wherein the time-slice is a contiguous period of time of processing unit execution, and the specified processing unit event comprises a cache event.

3. The computer program product of claim 2, wherein the first interval of execution comprises an initial interval of execution within the time-slice, and the second interval of execution comprises a most-recently completed interval of execution within the time-slice, and wherein the first interval of execution and the second interval of execution are of equal duration.

4. The computer program product of claim 3, wherein the second interval of execution comprises a last interval of execution within the time-slice.

5. The computer program product of claim 1, wherein the counting comprises using time-slice-instrumentation counters local to the processing unit in performing the counting of the occurrence of the specified processing unit event during the time-slice of the processing unit execution.

6. The computer program of claim 1, wherein the specified processing unit event comprises a data cache event selected from a group consisting of: a cache miss and a cache hit.

7. The computer program product of claim 1, wherein the collecting is initiated by executing a time-slice-instrumentation on instruction.

8. The computer program product of claim 1, wherein the retaining is initiated by executing a store time-slice-instrumentation counters instruction.

9. A computer system for facilitating processing within a computing environment, the computer system comprising:
    a memory; and
    a processor communicatively coupled with the memory, wherein the computer system is configured to perform a method, the method comprising:
        collecting time-slice-instrumentation information for a processing unit during execution, wherein the processing unit interleaves processing of multiple different units of work across multiple contiguous time-slices, and during a time-slice, a single unit of work of the multiple different units of work is processed by the processing unit, the collecting including:
            separating a time-slice of the processing unit execution into a plurality of intervals of execution, including a first interval of execution and a second interval of execution;
            counting, at least in part, occurrence of a specified processing unit event during the first interval of execution of the time-slice of the processing unit execution and counting occurrence of the specified processing unit event during the second interval of execution of the time-slice of the processing unit execution, the first interval of execution being earlier in the time-slice than the second interval of execution;
            retaining counted processing unit events occurring during the first interval of execution within the time-slice and the second interval of execution within the time-slice; and
            using the counted processing unit events occurring during the first interval of execution within the time-slice and the second interval of execution within the time-slice to adjust a processing schedule of the multiple different units of work by the processing unit.

10. The computer system of claim 9, where the time-slice is a contiguous period of time of processing unit execution, and the specified processing unit event comprises a cache event.

11. The computer system of claim 10, wherein the first interval of execution comprises an initial interval of execution within the time-slice, and the second interval of execution comprises a most-recently completed interval of execution within the time-slice, and wherein the first interval of execution and the second interval of execution are of equal duration.

12. The computer system of claim 11, wherein the second interval of execution comprises a last interval of execution within the time-slice.

13. The computer system of claim 9, wherein the counting comprises using time-slice-instrumentation counters local to the processing unit in performing the counting of the occurrence of the specified processing unit event during the time-slice of the processing unit execution.

14. The computer system of claim 9, wherein the collecting is initiated by executing a time-slice-instrumentation on instruction, and the retaining is initiated by executing a store time-slice-instrument counters instruction.

15. A computer-implemented method of facilitating processing within a computing environment, the computer-implemented method comprising:
   collecting time-slice-instrumentation information for a processing unit during execution, wherein the processing unit interleaves processing of multiple different units of work across multiple contiguous time-slices, and during a time-slice, a single unit of work of the multiple different units of work is processed by the processing unit, the collecting comprising:
      separating a time-slice of the processing unit execution into a plurality of intervals of execution, including a first interval of execution and a second interval of execution;
      counting occurrence of a specified processing unit event during the first interval of execution of the time-slice of the processing unit execution and counting occurrence of the specified processing unit event during the second interval of execution of the time-slice of the processing unit execution, the first interval of execution being earlier in the time-slice than the second interval of execution;
      retaining counted processing unit events occurring during the first interval of execution time and the second interval of execution time of the time-slice; and
      using the counted processing unit events occurring during the first interval of execution within the time-slice and the second interval of execution within the time-slice to adjust a processing schedule of the multiple different units of work by the processing unit.

16. The computer-implemented method of claim 15, where the time-slice is a contiguous period of time of processing unit execution, and the specified processing unit event comprises a cache event.

17. The computer-implemented method of claim 16, wherein the first interval of execution comprises on initial interval of execution within the time-slice, and the second interval of execution comprises a most-recently completed interval of execution within the time-slice, and wherein the first interval of execution and the second interval of execution are of equal duration.

18. The computer-implemented method of claim 17, wherein the second interval of execution time comprises a last interval of execution within the time-slice.

19. The computer-implemented method of claim 15, wherein the collecting is initiated by executing a time-slice-instrumentation on instruction, and the retaining is initiated by executing a store time-slice-instrument counters instruction.

* * * * *